United States Patent
Ptaszynski et al.

(10) Patent No.: US 11,373,034 B2
(45) Date of Patent: Jun. 28, 2022

(54) METHOD AND SYSTEM FOR DYNAMIC FORM GENERATION INFRASTRUCTURE

(71) Applicant: Verizon Patent and Licensing Inc., Arlington, VA (US)

(72) Inventors: Joseph Peter Ptaszynski, Cumming, GA (US); Suzanne E. Spalding, Milton, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 113 days.

(21) Appl. No.: 16/272,214

(22) Filed: Feb. 11, 2019

(65) Prior Publication Data
US 2020/0257759 A1 Aug. 13, 2020

(51) Int. Cl.
| G06F 17/00 | (2019.01) |
| G06F 40/174 | (2020.01) |
| H04L 41/22 | (2022.01) |
| G06F 3/0482 | (2013.01) |
| G06F 3/0486 | (2013.01) |
| G06F 3/04847 | (2022.01) |
| G06F 40/106 | (2020.01) |
| G06F 40/186 | (2020.01) |

(52) U.S. Cl.
CPC .......... *G06F 40/174* (2020.01); *G06F 3/0482* (2013.01); *G06F 3/0486* (2013.01); *G06F 3/04847* (2013.01); *G06F 40/106* (2020.01); *G06F 40/186* (2020.01); *H04L 41/22* (2013.01)

(58) Field of Classification Search
CPC ..... G06F 40/106; G06F 40/186; G06F 40/174
See application file for complete search history.

(56) References Cited

U.S. PATENT DOCUMENTS

| 5,490,243 A * | 2/1996 | Millman | G06F 40/174 715/209 |
| 7,734,995 B1 * | 6/2010 | Saikaly | G06F 40/186 715/200 |
| 7,827,478 B2 * | 11/2010 | Farr | G06F 40/174 715/222 |
| 7,971,141 B1 * | 6/2011 | Quinn | G06Q 40/10 715/721 |

(Continued)

OTHER PUBLICATIONS https://webapps.stackexchange.com/questions/40833/how-to-make-subquestions-in-google-forms, 3 pages (Year: 2014).*

*Primary Examiner* — Mohammed H Zuberi

(57) ABSTRACT

Systems and methods described herein provide a database-driven interdepartmental workflow, communication, and data gathering tool that allows forms to be designed without relying on trained software developers. A network device stores control object definitions and provides a section user interface to solicit a compilation of control objects for a section template. The network device provides a forms user interface to assemble multiple section templates, from a group of stored section templates that includes the section template, into an interactive form. The forms user interface generates section path logic options for each of the selected sections based on a multi-level hierarchy and key input terms supplied by a user. The network device provides for access, by other registered users, to the interactive form; receives form data via the interactive form; and stores the form data associated with the interactive form.

20 Claims, 18 Drawing Sheets

(56) References Cited

U.S. PATENT DOCUMENTS

| | | | | |
|---|---|---|---|---|
| 8,190,988 B2* | 5/2012 | Eckelman | G06F 40/174 | 715/223 |
| 8,756,489 B2* | 6/2014 | Richardt | G06F 40/174 | 715/222 |
| 8,850,304 B2* | 9/2014 | Ye | G06Q 10/06 | 715/226 |
| 9,218,331 B2* | 12/2015 | Kimber | G06F 40/14 | |
| 9,928,230 B1* | 3/2018 | Jain | G06F 40/103 | |
| 2002/0062342 A1* | 5/2002 | Sidles | H04L 67/2804 | 709/203 |
| 2004/0073868 A1* | 4/2004 | Easter | G06F 40/174 | 715/225 |
| 2004/0237030 A1* | 11/2004 | Malkin | H04L 67/02 | 715/222 |
| 2005/0086587 A1* | 4/2005 | Balz | G06F 40/174 | 715/221 |
| 2006/0031757 A9* | 2/2006 | Vincent | G06F 3/04812 | 715/234 |
| 2006/0064631 A1* | 3/2006 | Parker | G06F 40/58 | 715/255 |
| 2006/0136810 A1* | 6/2006 | Truong | G06F 40/174 | 715/222 |
| 2007/0074101 A1* | 3/2007 | Uthe | G06F 40/106 | 715/236 |
| 2007/0192671 A1* | 8/2007 | Rufener | G06F 40/166 | 715/205 |
| 2008/0091700 A1* | 4/2008 | Brotherson | G06F 40/186 | |
| 2010/0179962 A1* | 7/2010 | Schuster | G06F 40/174 | 707/769 |
| 2013/0054678 A1* | 2/2013 | Williams | G06F 40/174 | 709/203 |
| 2015/0220233 A1* | 8/2015 | Kok | G06F 3/0605 | 715/222 |
| 2017/0235713 A1* | 8/2017 | Martensson | G06F 40/174 | 715/221 |
| 2018/0300500 A1* | 10/2018 | Chen | H04L 67/02 | |
| 2019/0129968 A1* | 5/2019 | Neylan | G06F 3/0643 | |
| 2020/0257759 A1* | 8/2020 | Ptaszynski | G06F 3/0482 | |
| 2020/0394259 A1* | 12/2020 | Onuma | G06F 3/0482 | |

* cited by examiner

METHOD AND SYSTEM FOR DYNAMIC FORM GENERATION INFRASTRUCTURE

BACKGROUND

In large corporations, many interdepartmental communication, workflow, and data gathering processes may rely on paper, phone, spreadsheets, and/or e-mail. Such forms of communications tend to promote information silos and may cause significant costs and delays in projects due to miscommunication, lost documentation, and a lack of reusability of the gathered data.

Custom one-off workflow applications may provide an improvement over the above processes, but still include costs and delays for change requests. For example, maintenance and changes to workflow applications may be required as processes evolve over time. These workflow applications may also require a knowledgeable software development staff that know how to generate code for the particular workflow applications.

BRIEF DESCRIPTION OF THE DRAWINGS

FIGS. 8-12 are illustrations of an exemplary section template user interface, according to implementations described herein; and FIGS. 13-18 are illustrations of an exemplary forms template user interface, according to implementations described herein.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Systems and methods described herein provide a workflow, communication, and data gathering tool that allows data entry forms and templates to be designed without having to individually code each instance. Automated creation of forms can be performed by users, assisted by path logic (e.g., artificial intelligence and/or machine learning path logic) to guide customized form generation. For example, when designing an interdepartmental workflow form, structured objects may be selected, with options for subsequent form sections presented based on the previous selections and section answers. Sections used to assemble forms and data generated by using completed forms may be centrally stored for access across departments.

According to one implementation, a network device stores control object definitions and provides a section user interface to solicit a compilation of control objects for a section template. The network device provides a forms user interface to assemble multiple section templates, from a group of stored section templates that includes the section template, into an interactive form. The forms user interface generates section path logic options for each of the selected sections based on a multi-level hierarchy and key input terms. The network device provides for access, by other registered users, to the interactive form; receives form data via the interactive form; and stores the form data associated with the interactive form.

Figure 1:
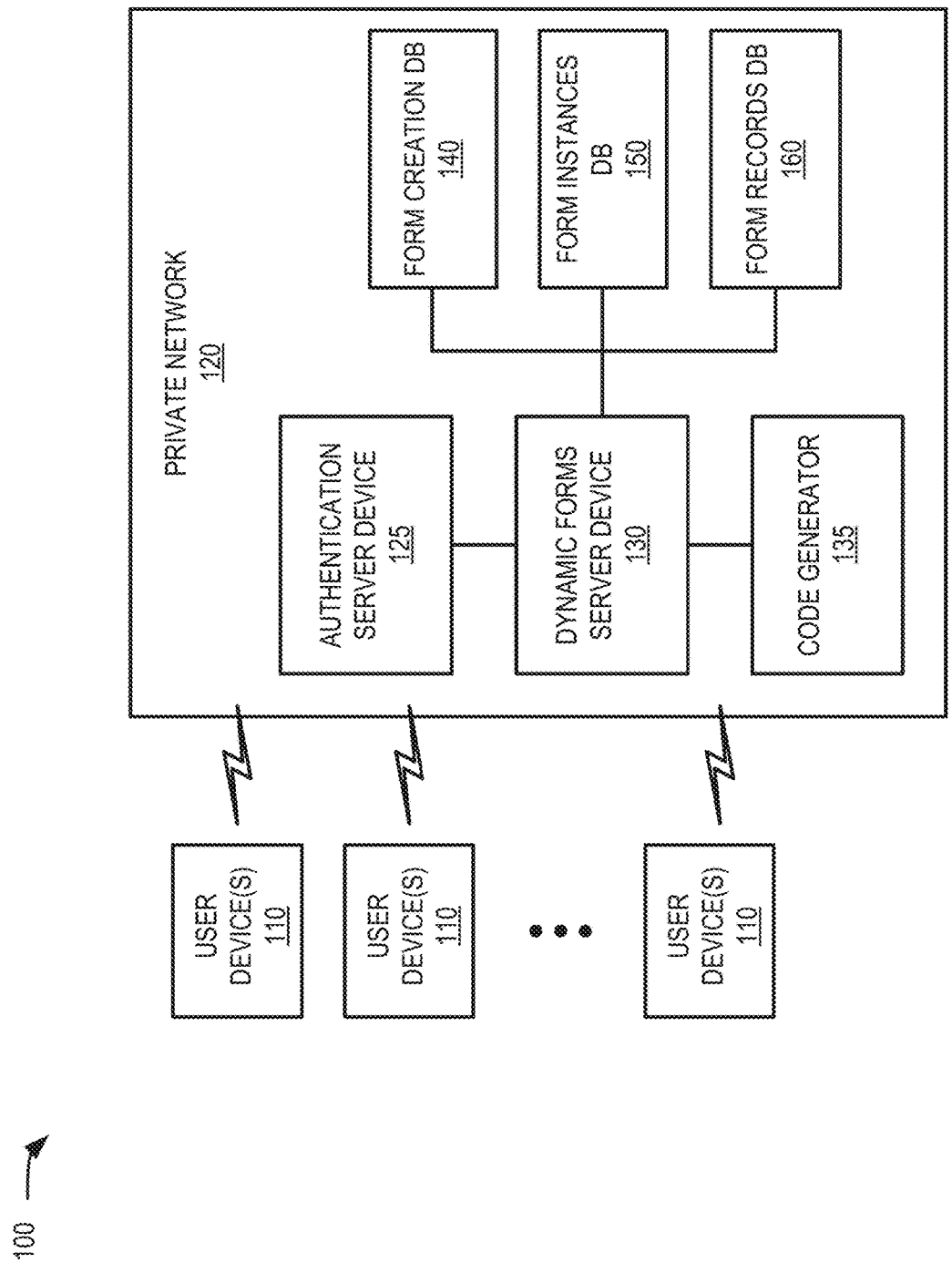
FIG. 1 is a diagram illustrating an exemplary network environment in which systems and methods described herein may be implemented.

FIG. 1 is a diagram illustrating an exemplary network environment 100 in which systems and methods described herein may be implemented. As shown in FIG. 1, environment 100 may include one or more user devices 110 connected to a private network 120. Private network 120 may include an authentication server device 125, a dynamic forms server device 130, a code generator 135, a form creation database (DB) 140, a form instances database 150, and a form records database 160.

The number, the type, and the arrangement of network devices in environment 100, as illustrated and described, are exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture. The number, the type, and the arrangement of networks in environment 100, as illustrated and described, are exemplary. Furthermore, while examples used herein refer to network devices for interdepartmental workflow, the systems and methods described herein may also be applied to any large-scale records data.

User devices 110 may include any type of communications device capable of exchanging information with private network 120. User devices 110 may enable users to send/receive messages, view content, and/or interact with other devices. For example, user devices 110 may include a personal computer (e.g., a laptop or desktop PC), a tablet computer, a smart phone, or other types of computational or communication devices that can communicate with devices in private network 120. In one implementation, each user device 110 may include a web browser or other software to enable user device 110 to access web sites or other information from devices in private network 120 (e.g., authentication server device 125, dynamic forms server device 130, etc.). In one implementation, a user device 110 includes, or is linked to, an application on whose behalf user device 110 communicates with private network 120 to read or query file data.

Private network 120 may include, for example, one or more private IP networks that use a private Internet protocol (IP) address space. Private network 120 may include a local area network (LAN), an intranet, a private wide area network (WAN), etc. In one implementation, private network 120 may implement one or more Virtual Private Networks (VPNs) for providing communication between, for example, any of user devices 110, authentication server device 125, dynamic forms server device 130, code generator 135, etc.

Private network 120 may be protected/separated from other networks, such as a public network, by a firewall. Although shown as a single element in FIG. 1, private network 120 may include a number of separate networks.

Authentication server device 125 (also referred to herein as authentication server 125) may include a network device that may implement techniques for authenticating, a user, an application, and/or the corresponding user device 110 upon which the application is installed, that requests access to private network 120. To access certain data or services of private network 120, authentication server 125 may require a user of user device 110 to provide appropriate credentials, such as user identifier and a correct corresponding password. According to one implementation, authentication server 125 may enforce different access levels for different users, where each access level grants or restricts access to select features of private network 120. For example, to ensure that services offered by private network 120 are available to only authorized devices/users, users may be registered and assigned different access levels or to a particular access group. Access levels may be hierarchical (e.g., with each level granting access to more information), distributed (e.g., with each access level granting access to different information), or combinations thereof. Authentication server 125 may store permissions (e.g., to access levels) assigned to each user. Permissions to different access levels may be added to or removed from a user's permissions set.

Dynamic forms server device 130 (also referred to herein as dynamic form server 130) may provide an interface (e.g., a text-based or graphical user interface) for creating forms, using forms, and/or retrieving form data. Dynamic forms server 130 may be implemented, for example as a software module that allows for creation of a department-specific form (and a corresponding implementation code) in human-readable input/output. In one implementation, as described further herein, dynamic forms server 130 may provide structured input fields to identify, for example, users, classes, items, lists, permissions, conditions, input types, and/or other information for a particular workflow form. According to one implementation, dynamic forms server 130 may provide a user interface to allow a user to assemble control objects into sections and sections into forms.

Code generator 135 may generate a script file for a form based on user input provided to dynamic forms server 130. In one implementation, code generator 135 may generate a JavaScript file that can be used in a live instance of the form. In another implementation, code generator 135 may generate a script file in another scripting language. Upon execution, a script file may, for example, provide instructions for presenting objects/sections based on a sequence of interactions specified in the script file.

Form creation database 140 may include a memory or data structure that includes generic control objects and sections (e.g., compilations of control objects), as described further herein, that can be used to create forms. Control objects may include, for example, an interactive or non-interactive object (e.g., hyper-text markup language (HTML)-compliant object) that can be presented to a user in a web browser.

Form instances database 150 may include a memory or data structure that includes completed form instances. Form instances in form instance database 150 may be accessed by authorized users of user devices (e.g., via dynamic forms server 130) for use and/or modification. According to one implementation, form instances in form instances database 150 may be shared among multiple departments or sub-networks associated with private network 120.

Form records database 160 may include a memory or data structure of input collected from each form instance. For example, a user of user device 110 may retrieve a form instance from form instance database 150 and provide input/records using the retrieved form. Form records database 160 may store data associated with each particular form along with designated access levels. According to an implementation, form records database 160 may include records from multiple departments or organizations using private network 120. Data analysis and sharing may be conducted on an interdepartmental basis among sections of different forms within form records database 150 based on access levels indicated within each form and/or section.

Although not shown in FIG. 1, network environment 100 may include a variety of other network devices, such as one or more dedicated servers or hubs for managing queries. As used herein, a network device may include hardware or a combination of software and hardware.

Figure 2:
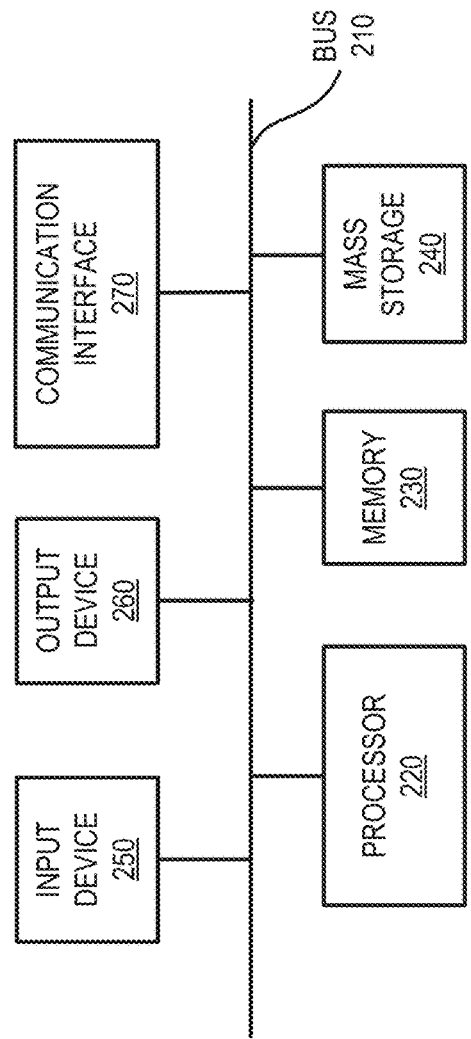
FIG. 2 is a diagram illustrating exemplary components of a network element that may correspond to one or more of the components/devices illustrated and described herein.

FIG. 2 is a block diagram showing exemplary components of a device 200, according to an embodiment. One or more of user device 110, authentication server 125, dynamic forms server 130, code generator 135, or other network devices in private network 120 may be implemented as a device 200. Device 200 may include a bus 210, a processor 220, a memory 230, mass storage 240, an input device 250, an output device 260, and a communication interface 270.

Bus 210 includes a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic. For example, processor 220 may be an x86 based CPU, and may use any operating system, which may include varieties of the Windows, UNIX, and/or Linux. Processor 220 may also use high-level analysis software packages and/or custom software written in any programming and/or scripting languages for interacting with other network entities that are communicatively coupled to device 200. Processor 220 may perform an operation and/or a process based on various techniques including, for example, multithreading, parallel processing, pipelining, interleaving, etc.

Memory 230 may include any type of dynamic storage device that may store information and/or instructions, for execution by processor 220, and/or any type of non-volatile storage device that may store information for use by processor 220. For example, memory 230 may include a RAM or another type of dynamic storage device, a ROM device or another type of static storage device, and/or a removable form of memory, such as a flash memory. Mass storage device 240 may include any type of on-board device suitable for storing large amounts of data, and may include one or more hard drives, solid state drives, and/or various types of arrays.

Input device 250, which may be optional, can allow an operator to input information into device 200, if required. Input device 250 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 250. Output device 260 may output information to an operator of device 200. Output device 260 may include a display, a printer, a speaker, and/or another type of output device. In some embodiments, device 200 may be managed remotely and may not include output device 260.

Communication interface 270 may include a transceiver and one or more antennas that enable device 200 to communicate within network environment 100 with other devices and/or systems. The communication interface 270 may be configured for wireless communications (e.g., radio-frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 270 may include a transmitter that converts baseband signals to RF signals and/or a receiver that converts RF signals to baseband signals.

As described herein, device 200 may perform certain operations relating to, designing, storing, and using interdepartmental forms. Device 200 may perform these operations in response to processor 220 executing software instructions contained in a computer-readable medium, such as memory 230 and/or mass storage 240. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein, such as, for example, processes 600 depicted in FIGS. 6 and 7. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2.

Figure 3:
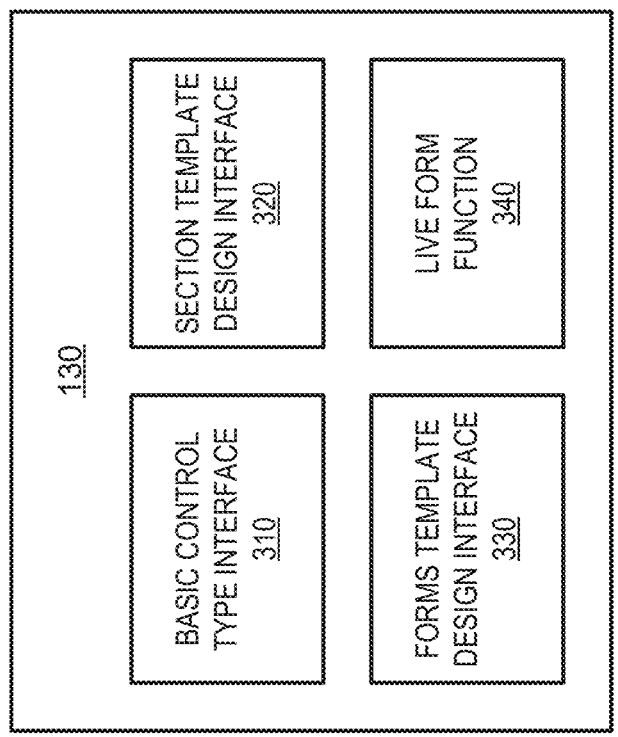
FIG. 3 is a diagram illustrating exemplary logical components of the dynamic forms server device of FIG. 1.

FIG. 3 is a diagram illustrating exemplary logical components of dynamic forms server 130. As shown in FIG. 3, dynamic forms server 130 may include basic control types interface 310, a section template design interface 320, a forms template design interface 330, a live form function 340.

Basic control type interface 310 may retrieve and present basic control types from, for example, form creation database 140. Basic control types may include basic control objects that may be selected by users of user devices 110. According to one implementation, a basic control type object may include any HTML5-compliant interactive or non-interactive control, or any unique custom control that works in a web browser. For example, basic control types interface 310 may include: (1) a checkbox set with label, (2) a data grid with label, (3) a date control with label (4) a radio button set with label, (5) simple static text, (6) a spyglass control with label, (7) a text area with label, or (8) a text input with label. In other implementations, different or additional basic control type objects may be used. As described further herein, each individual basic control type defines what attributes are configurable when paired with a section template object. Each individual basic control type defines how it will be rendered on a screen (e.g., output device 260 of user device 110) by live form function 340.

Section template design interface 320 may provide an interface (e.g., a text-based or graphical user interface) for designing sections. Sections may be compiled from basic control type objects selected by the user. Section template design interface 320 may assign a unique section identifier for each new section template. Section template design interface 320 may also solicit, from a user, preferences such as a section template name, a section template type, and automatic notifications. For each section type, section template design interface 320 may solicit an order for the selected control objects within the section template, including a number of object rows and object types to be inserted in each row. Based on user selections, section template design interface 320 may provide structured input to solicit additional section features, such as control setting for each of the selected objects. Section template design interface 320 is described further in connection with FIG. 4.

Figure 4:
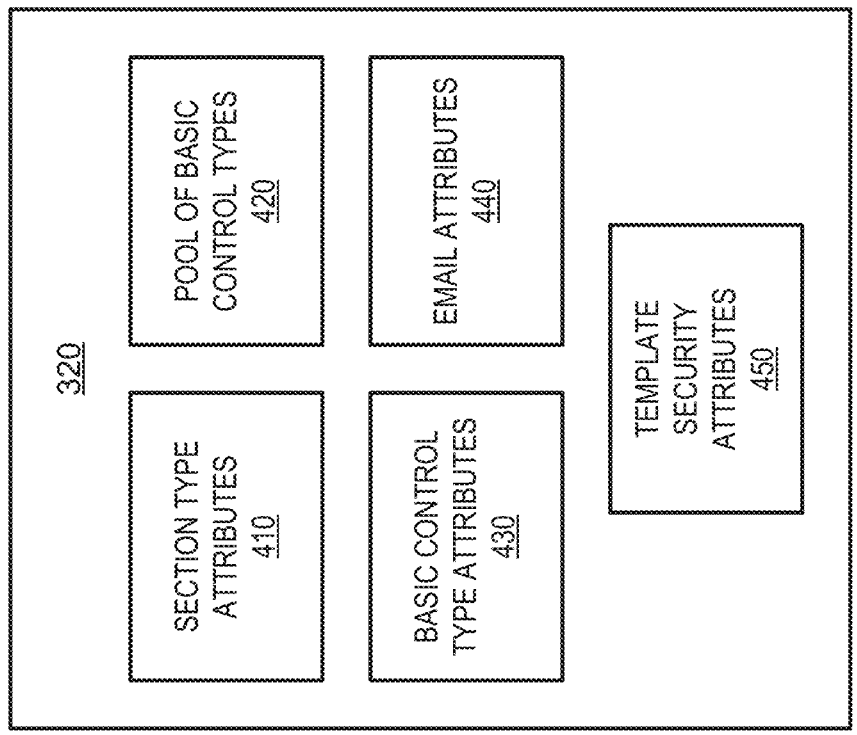
FIG. 4 is a diagram illustrating exemplary logical components of the section template design interface of FIG. 3.

FIG. 4 is a diagram illustrating exemplary logical components of section template design interface 320. As shown in FIG. 4, section templates 320 may include section template objects including the following parts: section type attributes 410, pool of basic control types 420, basic control type attributes 430, e-mail attributes 440, and template security attributes 450. Some aspects of FIG. 4 are described in connection with FIGS. 8-12, which include illustrations of exemplary user interfaces that may be presented in a "Section Template" tab by section template design interface 320.

Figure 8:
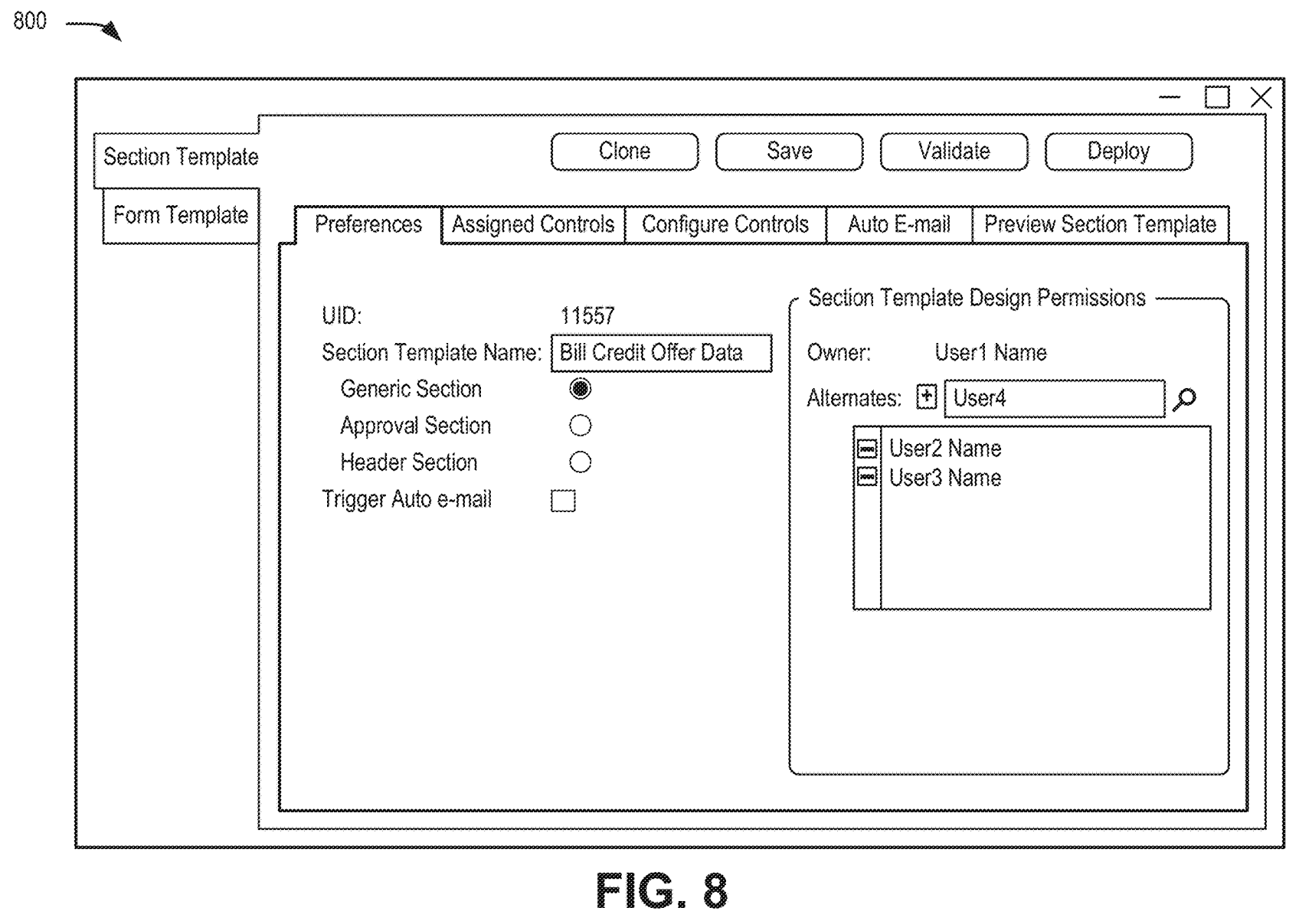

Section type attributes 410 may include multiple section types that may be selected by a user: a generic section, an approval section, and a header section. For example, as shown in FIG. 8, user interface 800 may include radio buttons to allow a user to select one of three section types (e.g., generic section, approval section, or header section). The generic section may include a container that holds a configurable amount (e.g., up to 999) Basic Control Type Objects of any combination. The approval section, in an exemplary implementation, may include a container with predetermined, preconfigured Basic Control Type Objects that can only have e-mail attributes 440 and template security attributes 450 configured. The header section may include a container with a predetermined, preconfigured basic control type object that can only have the e-mail attributes 440 and template security attributes 450 configured.

Figure 9:
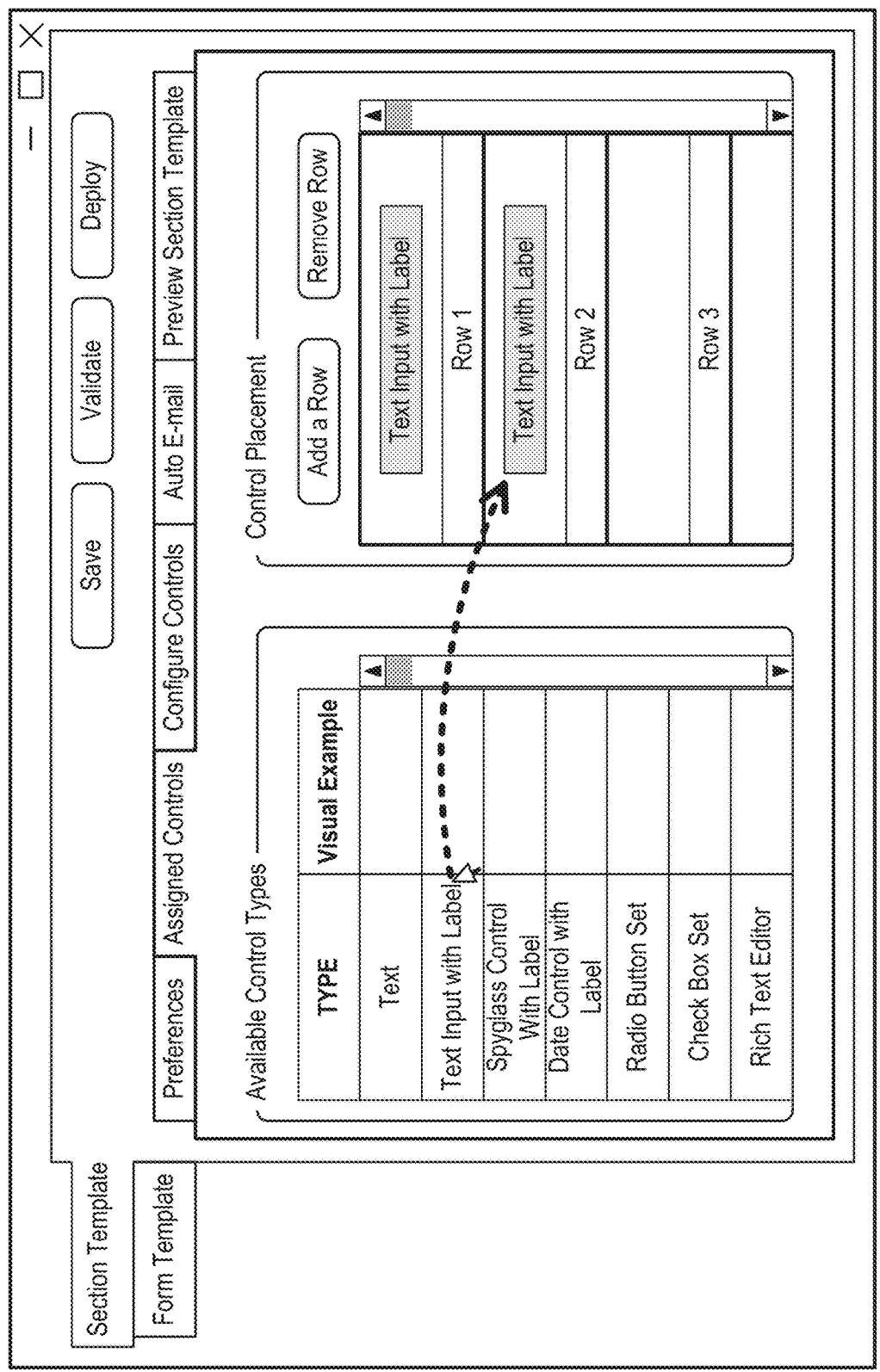

Pool of basic control types 420 may include a filtered list of the previously mentioned Basic Control Type Objects that a user can select from and associate to a Generic Section one or more times. For example, as shown in FIG. 9, user interface 900 may include a "Control Placement" section that allows a user (e.g., a user with section template design permission from FIG. 8) to define a number of rows for a section. The user may then drag a control object from the "available Control Types" section to a desired row in the control placement section.

Figure 10:
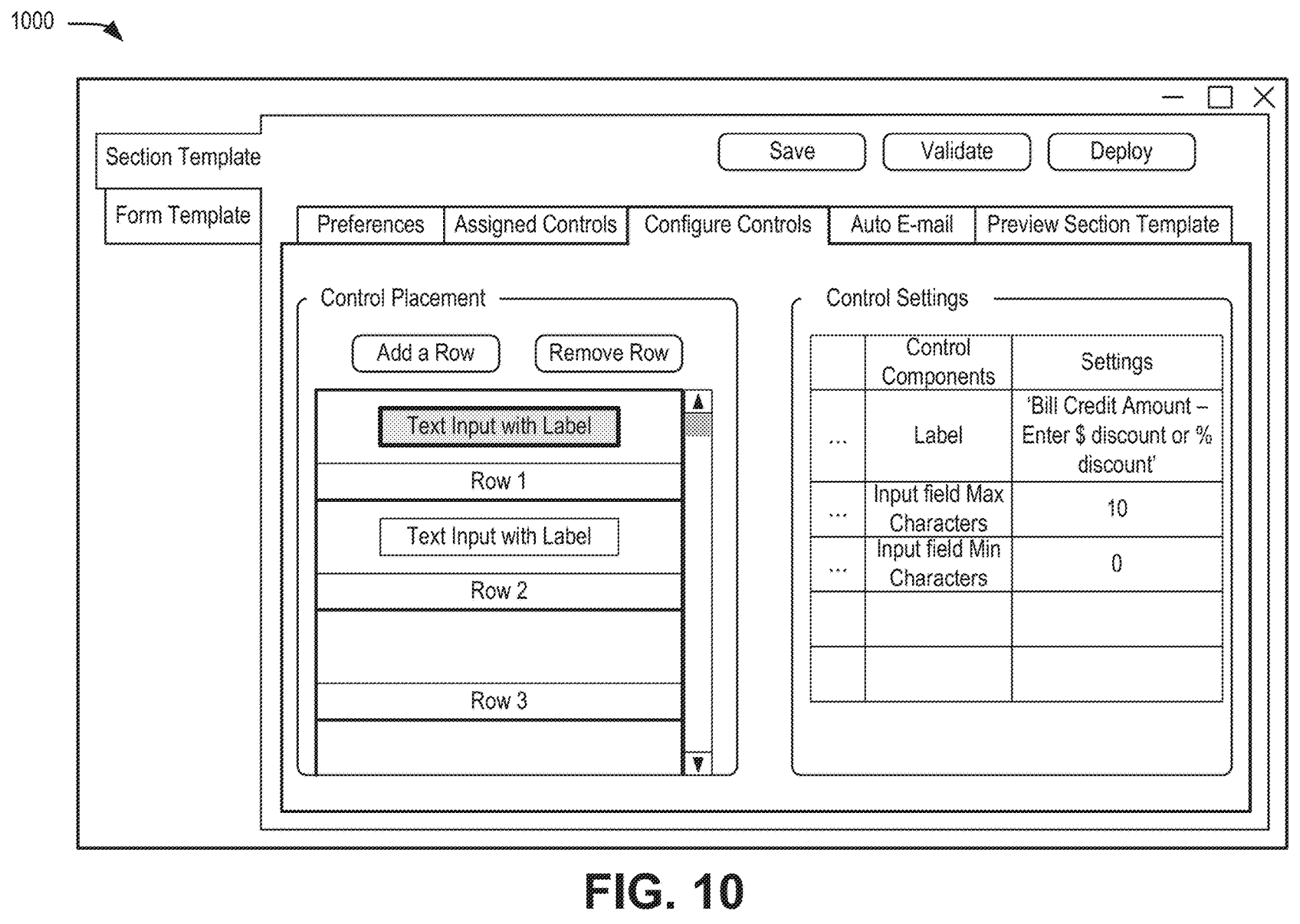

Basic control type attributes 430 may include the configured settings per instance of a Basic Control Type Objects paired with the Section Template Object. For example, as shown in FIG. 10, user interface 1000 may include a "Control Placement" section and a "Control Settings" section. A user may select a particular control in from the "Control Placement" section to view the settings unique to the particular control object and edit the settings by selecting, for example, the ellipsis associated with each setting.

Figure 11:
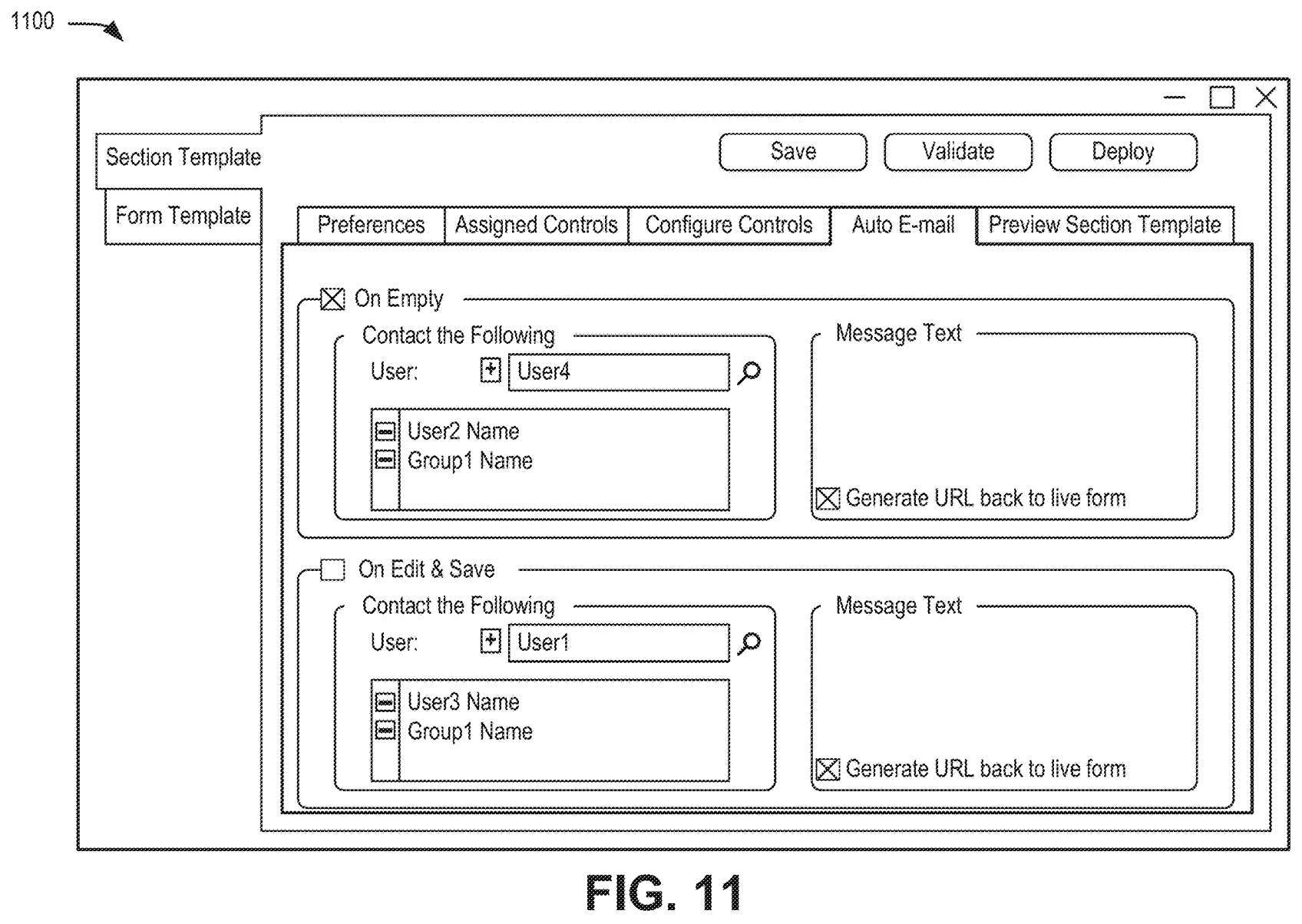

E-mail attributes 440 may include the configured settings for determining when a system generated e-mail should occur in a live form, along with who gets e-mailed, the text for the subject and body of the e-mail, and if a system generated link that will drive the user back into the application and auto load the live instance of the form should occur. For example, as shown in FIG. 11, user interface 1100 may include a section to select automatic e-mails. Automatic e-mails can be generated by dynamic forms server 130, for example, when the corresponding section is completely empty of user input, and/or when the section has been edited and the change has been saved. A spyglass containing all active users of the system will be available for a user to select contacts (e.g., e-mail addresses, an account name, etc.) along with custom e-mail groups. The message has the option to have a link (e.g., a uniform resource locator (URL)) that will auto log the user into the system, and take the user directly into the live form.

Template security attributes 450 may be used to determine who can edit a Section Template. In one implementation a maximum number of editors for a Section Template may be configured (e.g., up to five editors). The first editor is typically the original creator of the Section Template Object. For example, as shown in FIG. 8, a "Section Template Design Permissions" section may be provided to indicate a section owner (e.g., the section design originator) and to allow a user to add or subtract alternate section design editors (e.g., "User2 Name," "User3 Name", etc.).

Figure 12:
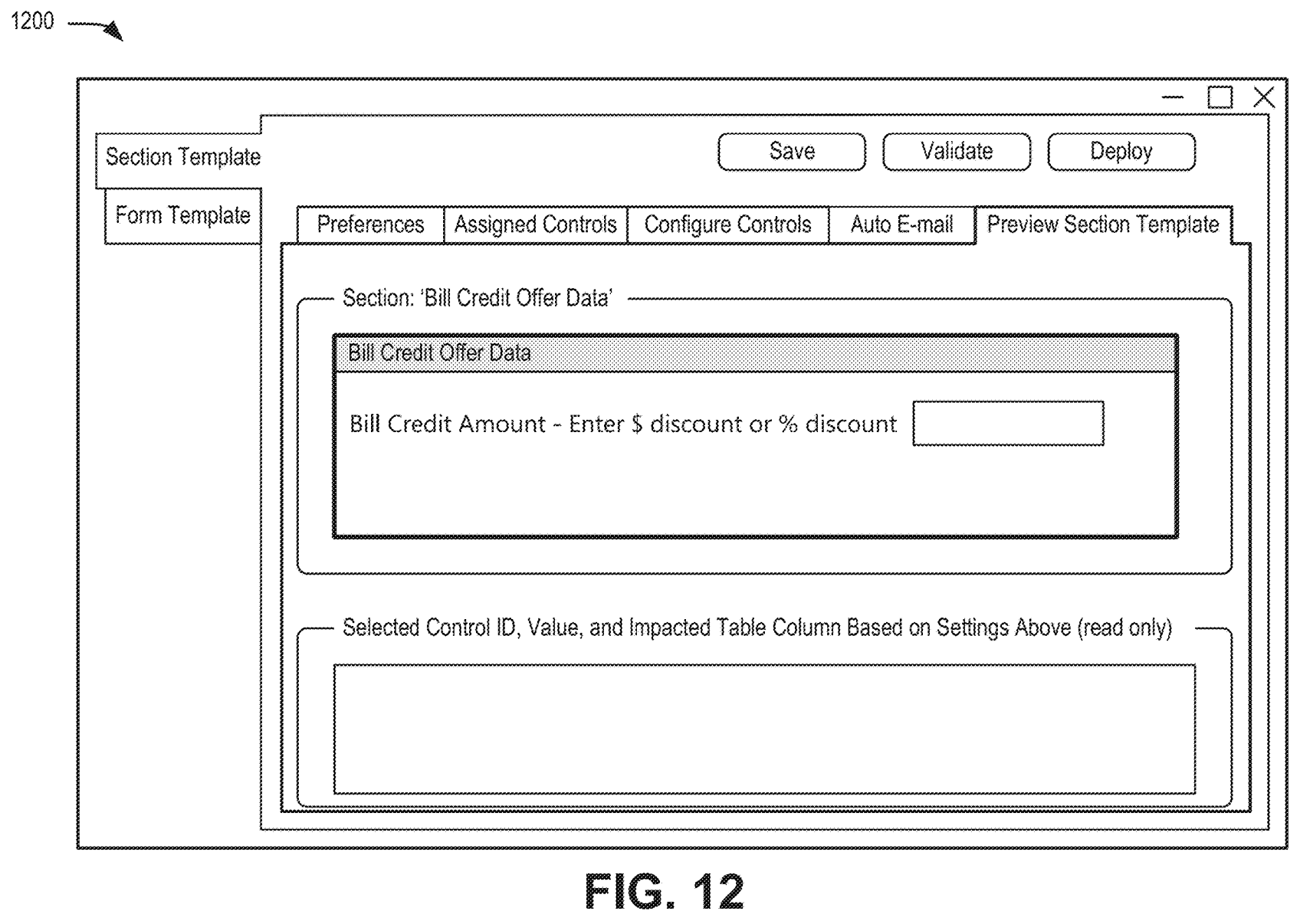

Section template design interface 320 may also provide an option for a user to preview a section by selecting a "Preview Section Template" tab, as shown in user interface 1200 of FIG. 12. The preview may generate a simulated section as it might appear when incorporated in a live form. User interface 1200 may provide an interactive rendering of the section so the user can test the controls. Additionally, user interface 1200 can show the control identifier (ID) (e.g., the assigned unique section identifier), value entered, and the database table and column (e.g., in form instances database 150) impacted once a control is used. This functionality supports both the users' review of the controls and developers working on analytics, reporting, and data routing custom back end functions.

Section template design interface 320 may also provide options for the user to save, validate, and/or deploy a section. If "save" is selected, section template design interface 320 may save the section (e.g., in form creation database 140) for completion or deployment in the future. If "validate" is selected, section template design interface 320 may review the section configuration for errors, omissions, consistency, etc. If "deploy" is selected, section template design interface 320 may store and log the validated section (e.g., in form creation database 140) for selection/retrieve from form template design interface 330.

Referring back to FIG. 3, forms template design interface 330 may provide an interface (e.g., a text-based or graphical user interface) for designing forms from deployed sections. Generally, forms template design interface 330 provides a step-by-step process to the form creation process without relying on traditional coding or software development. Forms template design interface 330 is described further in connection with FIG. 5.

Figure 5:
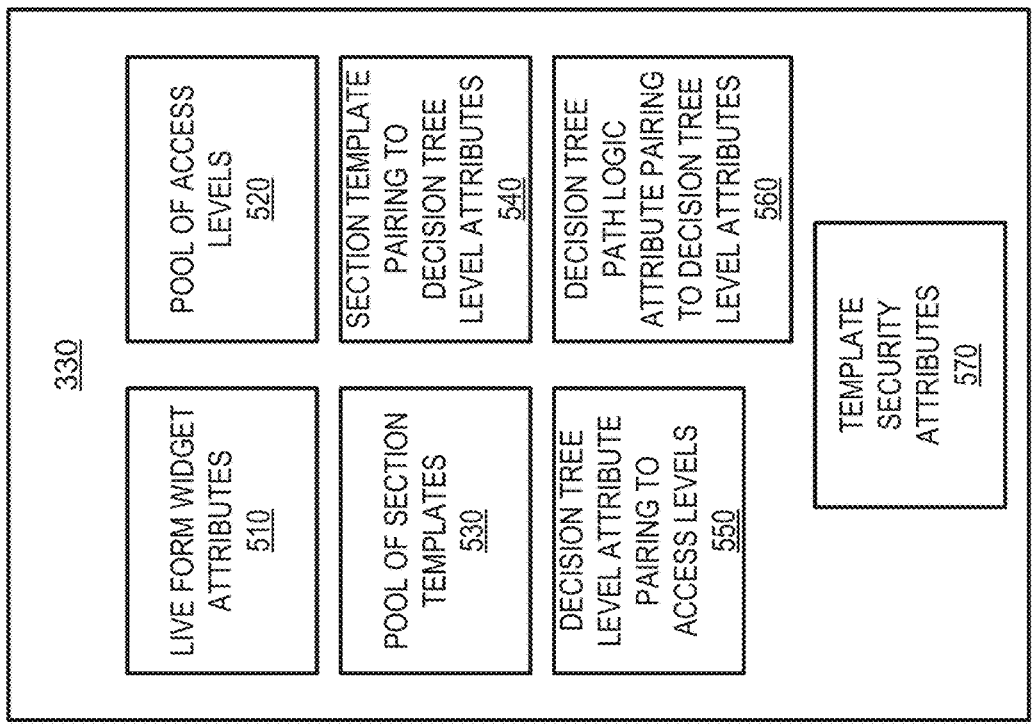
FIG. 5 is a diagram illustrating exemplary logical components of the forms template design interface of FIG. 3.

FIG. 5 is a diagram illustrating exemplary logical components of forms template design interface 330. As shown in FIG. 5, form template design interface 330 may include live form widget attributes 510, pool of access levels 520, pool of section templates 530, section template pairing to decision tree level attributes 540, decision tree level attribute pairing to access levels 550, decision tree path logic attribute pairing to decision tree level attributes 560, and template security attributes 570. Some aspects of FIG. 5 are described in connection with FIGS. 13-18, which include illustrations of exemplary user interfaces that may be presented in a "Form Template" tab by form template design interface 330.

Figure 13:
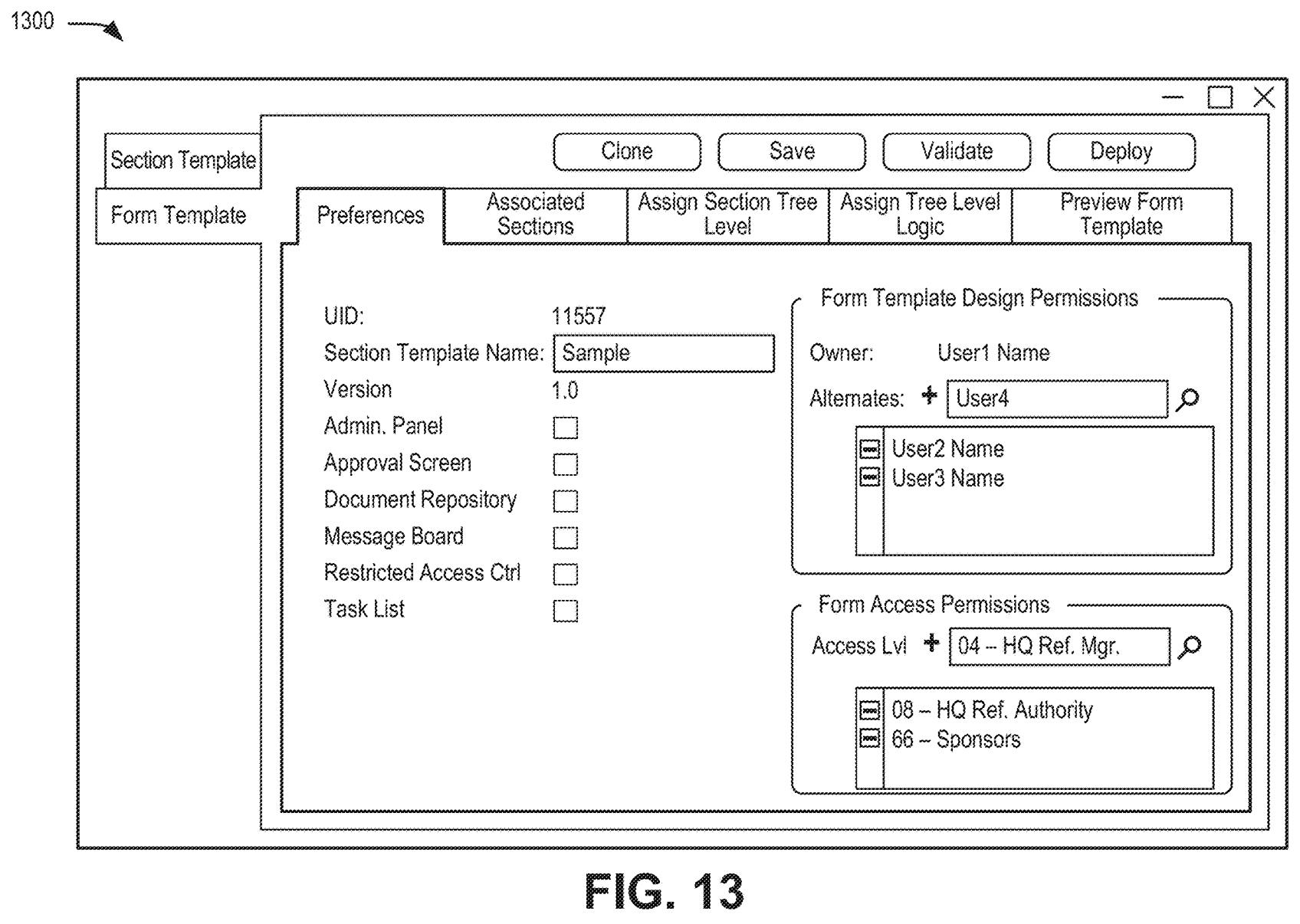

Live form widget attributes 510 may include several of the following components in any combination: an approval screen, a document repository, a message board, a restricted access list, and a task list. For example, as shown in FIG. 13, user interface 1300 may provide a unique identifier (UID) and solicit a form template name. Live form widget attributes 510 may include radio buttons to allow a user to select any of the available widgets. The approval screen may solicit settings input to determine where Sections with the Section Type of 'Approval' should be rendered in the live form. If the Approval Screen Widget attribute is set, all Sections with a Section Type of 'Approval' will be rendered in a separate Approval Tab in the live form. Otherwise, the Section will be rendered in line with the other sections in the Live Form.

The document repository in live form widget attributes 510 may include settings to determine if the document repository functionality should be included with the Live Form. The Document Repository may store files of many types that are tied to the Live Form instance. The Message Board in live form widget attributes 510 may include a setting to determine if the Message Board functionality should be included with the Live Form. The Message Board is an internal communications and storage feature that is tied to the Live Form instance.

The Restricted Access List in live form widget attributes 510 may solicit setting to determine if the Restricted Access list functionality should be included with the Live Form. The Restricted Access List further limits who can view and edit a Live Form instance. The task list in live form widget attributes 510 may include setting to determine if the Task List functionality should be included with the Live Form. The Task List displays overview/helper text for each section.

Pool of access levels 520 includes a collection of available Access Levels that will be allowed to use the Live Form instance of the Form Template in some way (e.g., to view, edit, etc.). For example, as shown in FIG. 13, user interface 1300 may provide a "Form Access Permissions" interface to identify particular access levels stored in the pool of access levels 520. Access levels available for selection may include pre-defined levels to which each registered user of private network 120 may be assigned. In one implementation pool of access levels 520 may correspond to access levels stored in authentication server 125. Thus, a form owner (and selected alternates) may limit access to a live form to particular user groups by access level.

Figure 14:
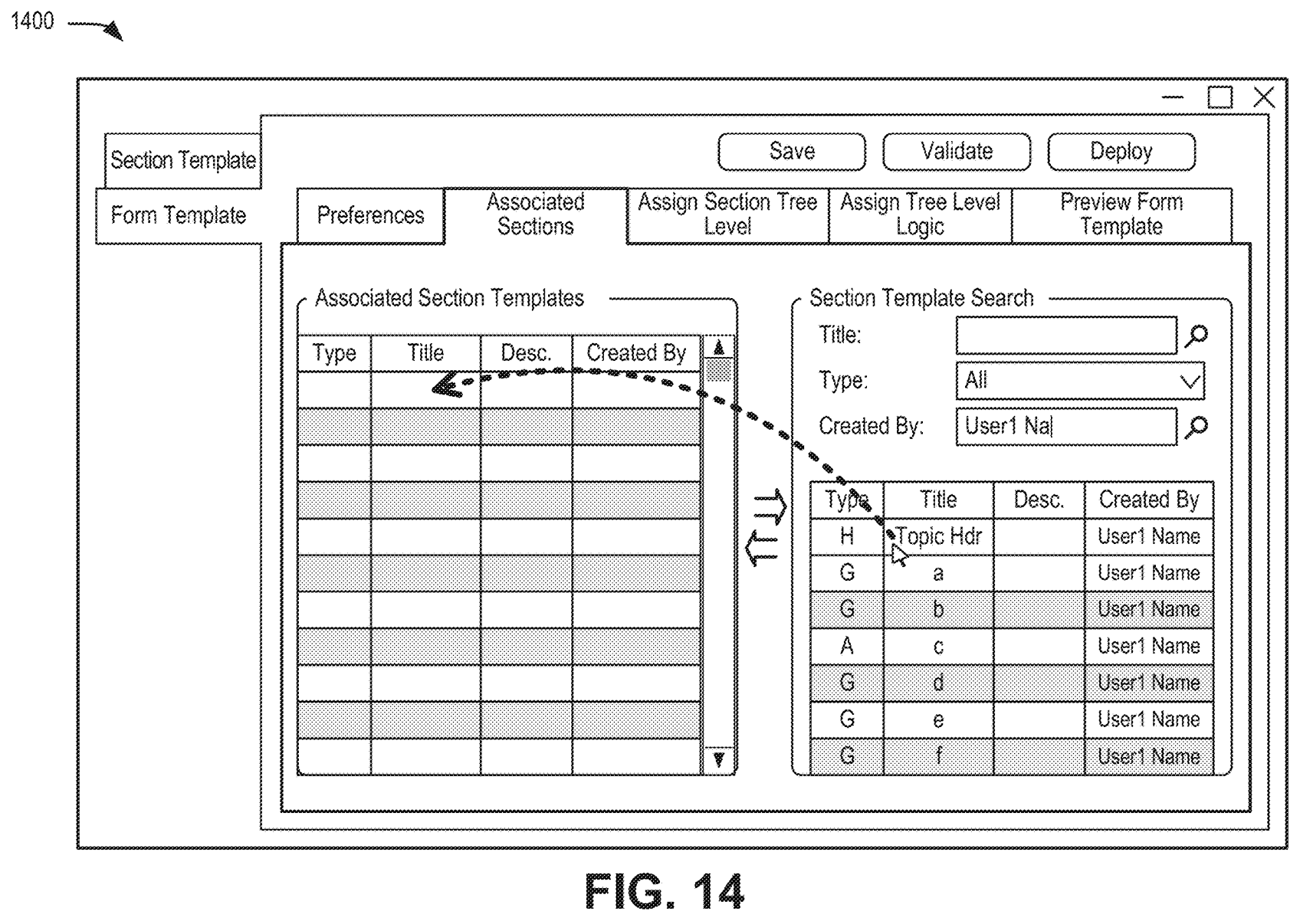

Pool of section templates 530 is a collection of Section Template Objects that will be used within the Form Template Object. For example, as shown in FIG. 14, user interface 1400 may provide a "Section Template Search" interface to allow a user to identify deployed forms (e.g., created using section template design interface 320) to apply to a new form. The "Section Template Search" interface may allow to user to enter search criteria based on a section title, section type (e.g., header, approval, generic, or all types), or section creator/owner. Search results from the "Section Template Search" interface may be moved (e.g., drag and drop) to an "Associated Section Templates" section, shown in FIG. 14, for later use.

Figure 15:
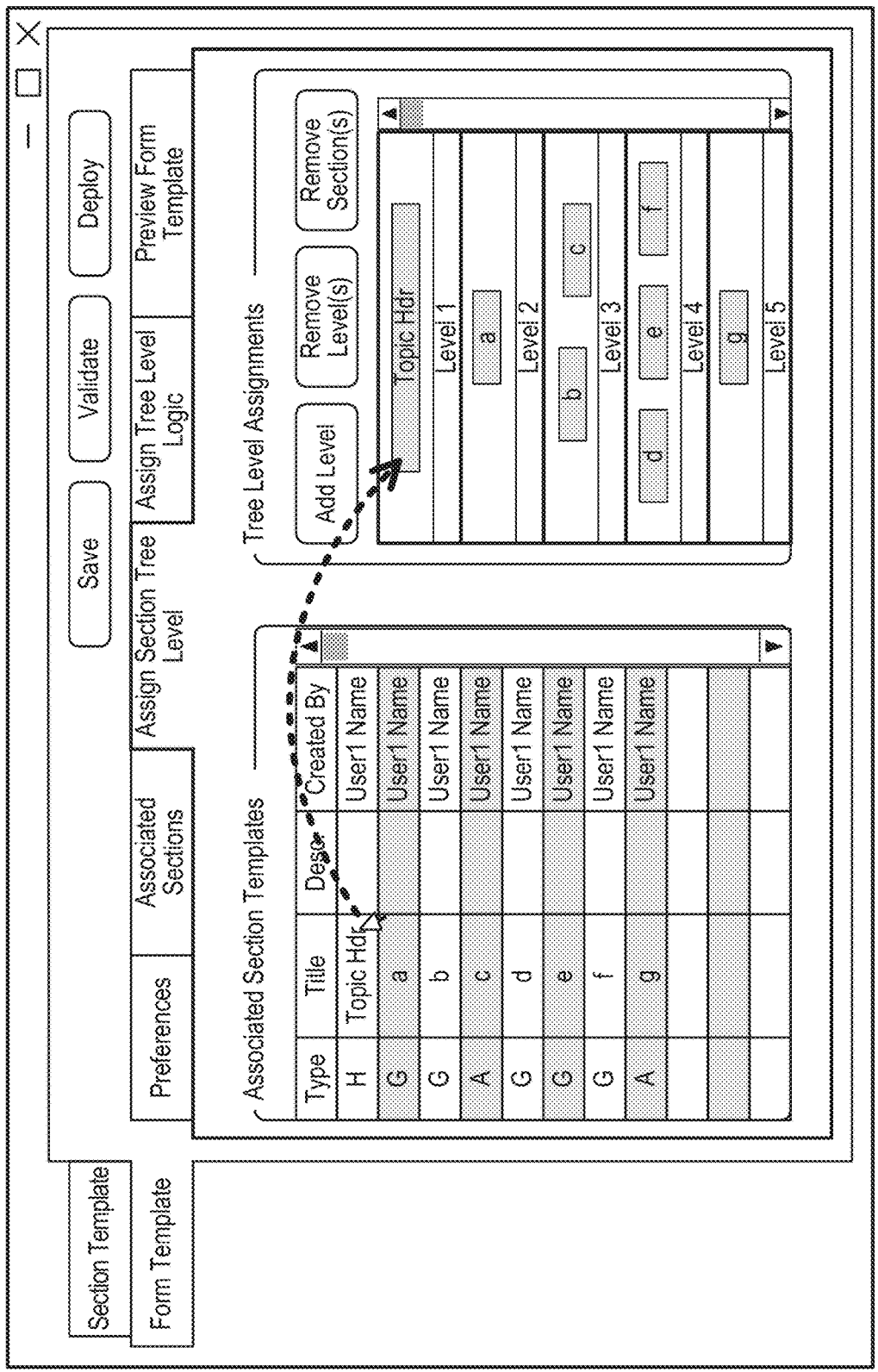
Figure 17:
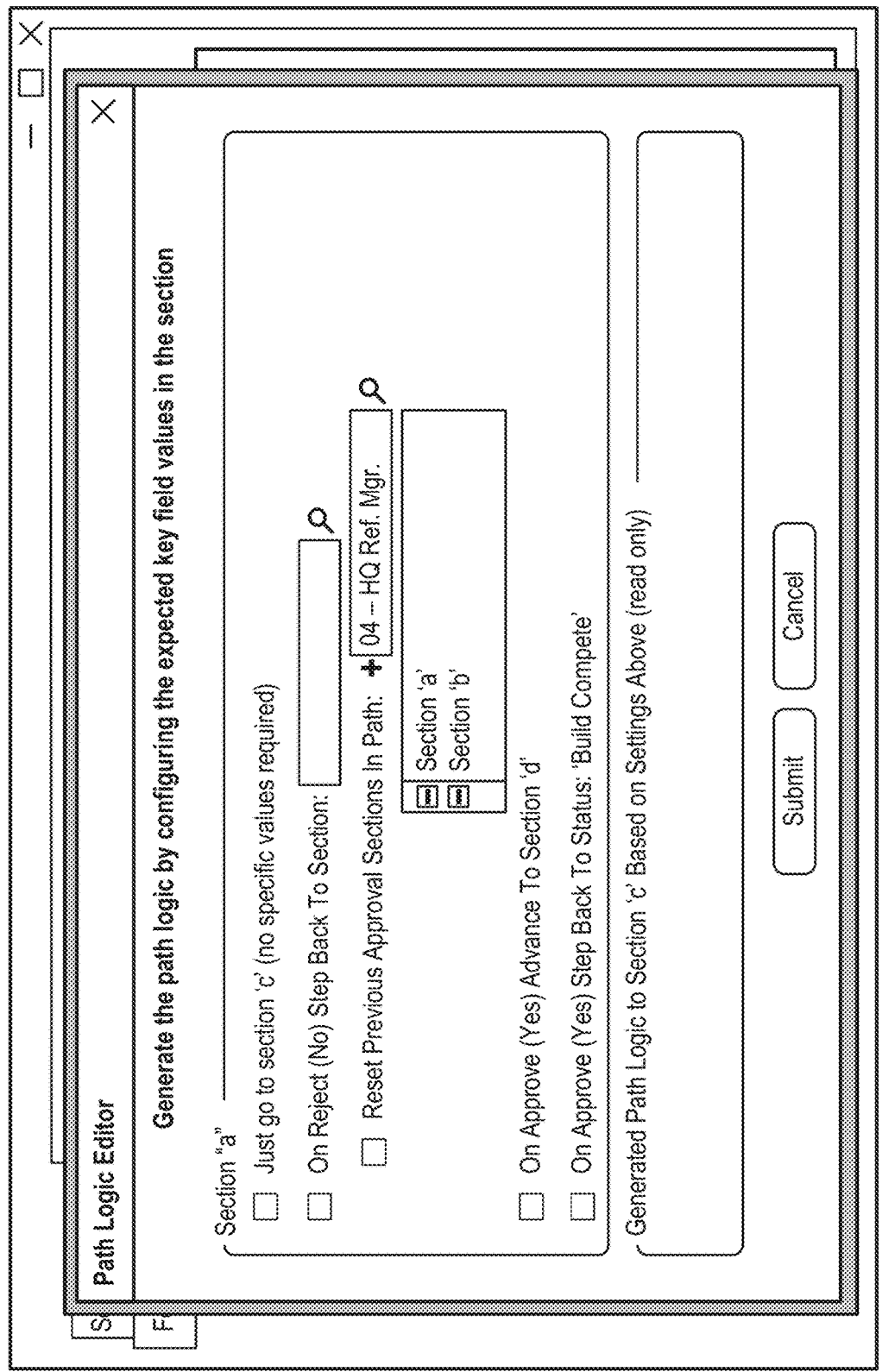

Section template pairing to decision tree level attributes 540 includes a Decision Tree structure with a preconfigured number of vertical levels (e.g., up to 999), where each level can contain up to the limit of pairings to a Section Template. In one implementation, the first level may only contain one Section Template which is of type: 'Header,' or more commonly known as the 'Root' of a tree. For example, as shown in FIG. 15, user interface 1500 may provide a "Tree Level Assignments" interface that a user can populate with sections from "Associated Section Templates" interface that was previously filled. Selections from the "Associated Section Templates" interface can be moved (e.g., drag and drop) to different levels of the "Tree Level Assignments" interface, shown in FIG. 15, to assemble a logic tree.

Figure 16:
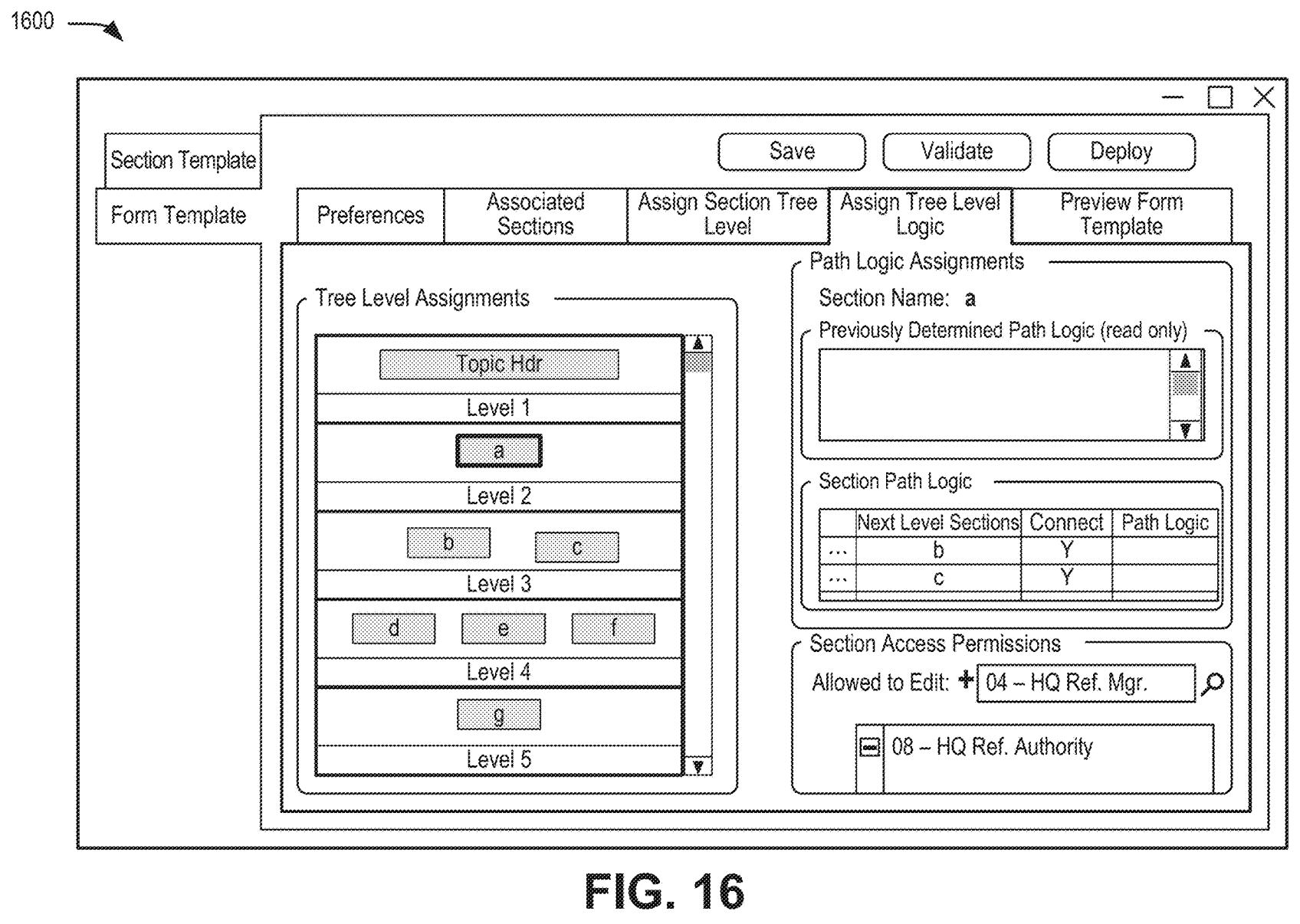

Decision tree level attribute pairing to access levels 550 may associate each section in the "Tree Level Assignments" interface with one or more Access Levels available from Pool of Access Levels 520. For example, as shown in FIG. 16, user interface 1600 may provide a "Section Access Permissions" interface for each selected section (e.g., section "a") in the Tree Level Assignments. Thus, individual sections within a Live Form may be assigned with different access levels on a section-by-section basis (e.g., for read-only, data entry, approving, etc.). Decision tree path logic attribute pairing to decision tree level attributes 560 assigns a logic path through a decision tree. Each pairing of a Tree Level Attribute will be paired with possible Path Logic settings/attributes. The stored combinations of selected/entered values in a Section Template along with which section template may be displayed to the user if those exact settings are entered/selected in the Live Form instance. For example, as shown in FIG. 16, user interface 1600 may provide a "Path Logic Assignments" interface. A user may select a section (e.g., section "a") to edit path logic to the next section(s) shown in the "Tree Level Assignments" interface. The ' . . . ' icon beside the available Next Level Sections in the "Section Path Logic" table may be selected to set flow logic to that section. However, it is not necessary that all sections connect. If the ' . . . ' icon is selected, in one implementation, user interface 1700 of FIG. 17 may provide a "Path Logic Editor" interface. In the "Path Logic Editor" interface, a user may enter expected input (e.g., answers to fields in the selected section) that would trigger advancement to the next section. Decision tree path logic attribute pairing to decision tree level attributes 560 may generate path logic and display the generated path logic to the user in the "Path Logic Editor" interface.

According to one implementation, dynamic forms server 130 (e.g., decision tree path logic attribute pairing to decision tree level attributes 560) may provide section path logic options for each section, based on the tree level assignments, section objects, and key terms. Artificial intelligence and/or machine learning techniques may be applied to provide recommendations and/or rank and list the more probable path options first. In one embodiment, a machine learning model may be initially provided to provide best path logic recommendations and then trained based on form creation data from other forms in form instances database 150. In other embodiments, data analytics may be used to identify most popular options or similar section combinations to provide path logic recommendations. In some implementations, decision tree path logic attribute pairing to decision tree level attributes 560 may include a deep learning artificial neural network model or a different type of machine learning model, such as, for example, a linear classifier, a naive Bayesian classifier, a kernel density estimation classifier, a support vector machine classifier, a maximum entropy classifier, a decision tree classifier, a random forest classifier, and/or another type of classifier.

Template security attributes 570 may solicit information to determine who can edit a Form Template. A limited number of editors for a Form Template may be defined, for example, by the form owner, and the first editor is typically the owner/original creator of the Form Template Object. For example, as shown in FIG. 13, user interface 1300 may provide a "Form Template Design Permissions" interface where the owner (e.g., 'User1 Name") is the default editor and additional names may be added as alternate editors.

Figure 18:
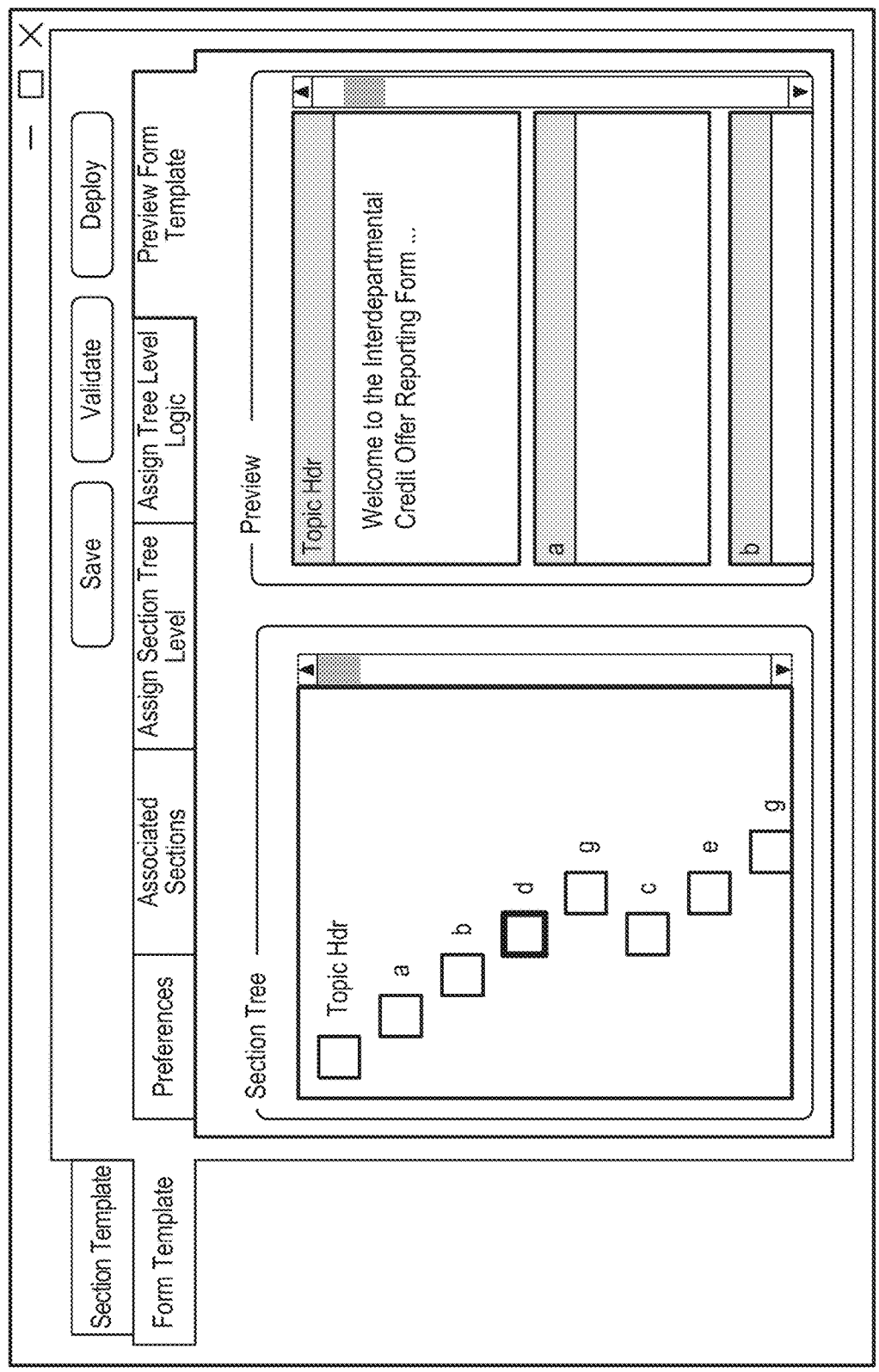

Forms template design interface 330 may also provide an option for a user to preview a section by selecting a "Preview Section Template" tab, as shown in interface 1800 of FIG. 18. The preview may generate a logic tree and a simulated form as it might appear when incorporated in a live form. According to an implementation, a user may select any section in the "Section Tree" interface (e.g., "d") and the sections leading up to that section (e.g., "Topic Hdr," "a," and "b") will be rendered in the "Preview" interface screen for review.

Referring again to FIG. 3, live form function 340 may receive requests from registered users (e.g. via user devices 110) to access a stored interactive form. Live form function 340 may execute function scripts to sequentially present logic paths for form sections, enforce access controls at the form and section level, and collect and store data from user input.

Although FIG. 3 shows exemplary logical components of dynamic forms server 130, in other implementations, dynamic forms server 130 may include fewer logical components, different logical components, or additional logical components than depicted in FIG. 3. Additionally, or alternatively, one or more logical components of dynamic forms server 130 may be implemented by a different network device in private network 120.

Figure 6:
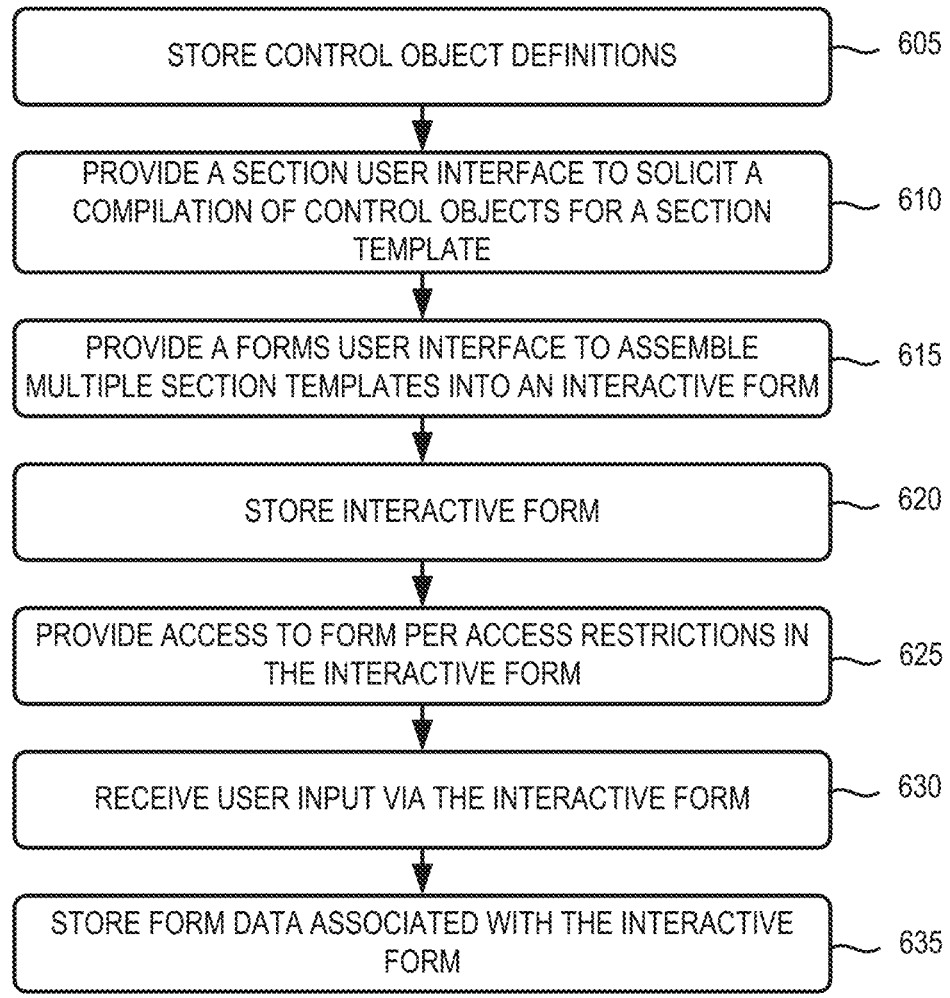
FIGS. 6 and 7 are flow diagrams illustrating an exemplary process for generating and implementing an interdepartmental workflow form, according to implementations described herein.

FIG. 6 is a flow diagram illustrating an exemplary process 600 for generating and implementing an interdepartmental workflow form, according to an implementation described herein. In one implementation, process 600 may be implemented by dynamic forms server 130. In another implementation, process 600 may be implemented by dynamic forms server 130 in conjunction with one or more other network devices of private network 120.

Referring to FIG. 6, process 600 may include storing control object definitions (block 605), and providing a section user interface to solicit a compilation of control objects for a section template (block 610). For example, dynamic forms server 130 may store locally or retrieve from form creation database 140 control objects that can be assembled into sections. A registered user (using user device 110) may access section template design interface 320 to create sections from one or more control objects (e.g., using interfaces 800-1200 of FIGS. 8-12). The completed sections may be stored, for example, in form creation database 140.

Process 600 may further include providing a forms user interface to assemble multiple section templates into an interactive form (block 615), and storing the interactive form (block 620). For example, the registered user (using user device 110) may access forms template design interface 330 to create an interactive form from multiple sections stored in form creation database 140 (e.g., using interfaces 1300-1800 of FIGS. 13-18). The completed form may be stored, for example, in form instances database 150.

Process 600 may also include providing access to the form per access restrictions in the interactive form (block 625), receiving user input via the interactive form (block 630), and storing form data associated with the interactive form (block 635). For example, another registered user (e.g., using user device 110) may access dynamic forms server 130 to retrieve a form instance. Upon selection of a particular interactive form, dynamic forms server 130 may verify the access level assigned to the user is permitted to use the selected interactive form. Additionally, or alternatively, dynamic forms server 130 may verify the user's access level on a section-by-section basis as the user works through the interactive form. User input for each form section may be received by dynamic forms server 130 and stored, for example, in form record database 160.

Figure 7:
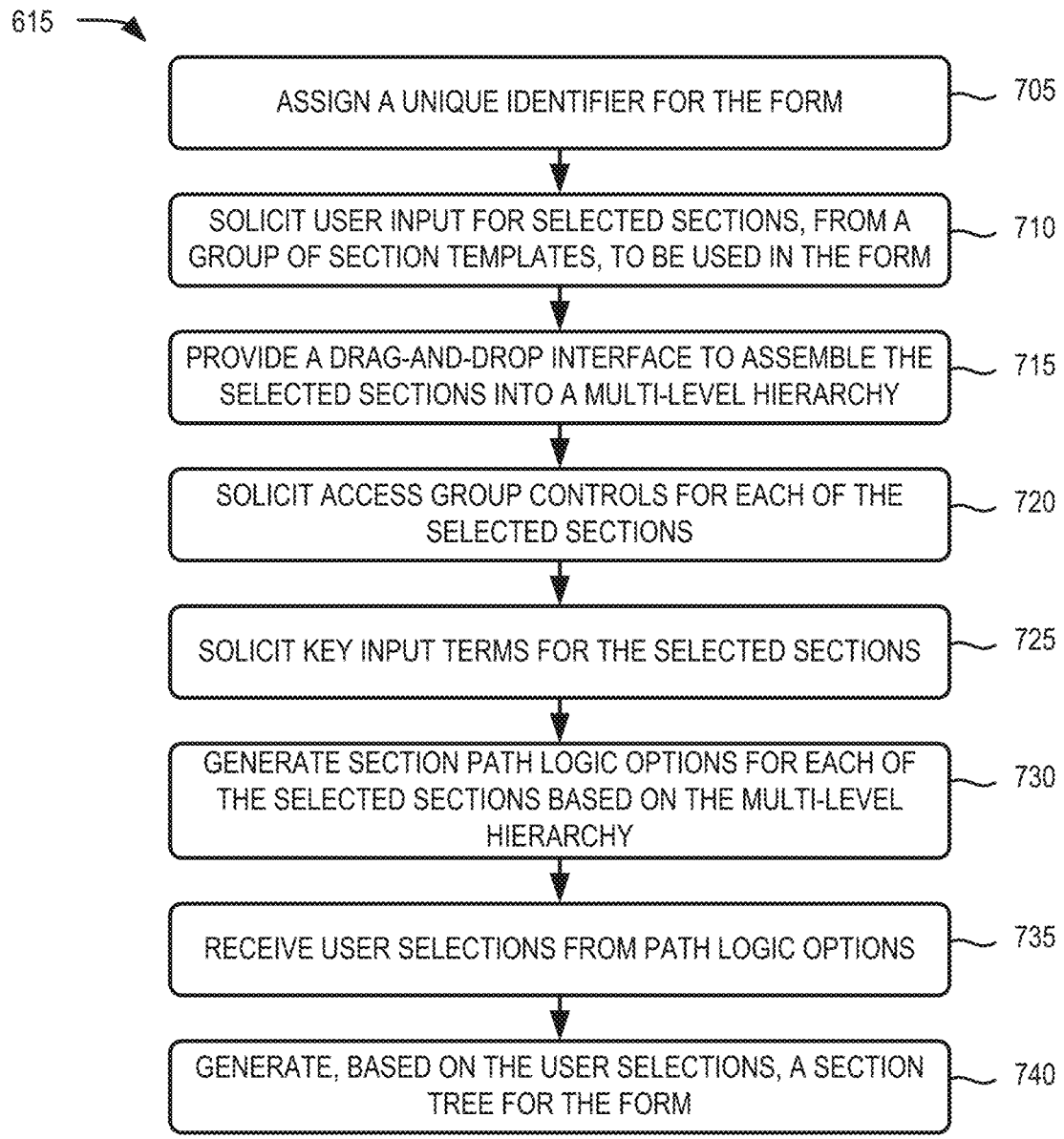

Process block 615 may include steps described in FIG. 7, according to an implementation described herein. Process block 615 may include assigning a unique identifier for the form (block 705), and soliciting user input for selected sections, from a group of section templates, to be used in the form (block 710). For example, as shown in interface 1300 of FIG. 13, dynamic forms server 130 may assign a unique identifier (UID) for a form and solicit other settings. As shown in interface 1400 of FIG. 14, a user may query deployed sections (e.g., by creator name, title, type, etc.) to select section to include in the interactive form.

Process block 615 may further include providing a drag-and-drop interface to assemble the selected sections into a multi-level hierarchy (block 715), soliciting access group controls for each of the selected sections (block 720), and soliciting key input terms for the selected sections (block 725). For example, as shown in interface 1500 of FIG. 15, dynamic forms server 130 may allow a user to identify different levels and add one or more sections to each level. As shown in interface 1600 of FIG. 16, a user may define access permissions for each section individually by assigning an access level or access group for each section. Dynamic forms server 130 may also use interface 1700, for example, to identify specific values/answers that will influence path logic for the interactive form.

Process block 615 may additionally include generating section path logic options for each of the selected sections based on the multi-level hierarchy (block 730), receiving user selections from path logic options (block 735), and generating, based on the user selections, a section tree for the form (block 740). For example, as shown in interface 1600 and 1700, a user may select a section, and dynamic forms server 130 may provide section path logic options for the section, based on the tree level assignments, section objects, and key terms. As shown in interface 1800 of FIG. 18, dynamic forms server 130 may generate a section tree that represents the high-level path for the interactive form. A user may select a section in the "Section Tree" interface and the sections leading up to that section (e.g., "Topic Hdr," "a," and "b") will be rendered in the "Preview" interface screen for review.

Systems and methods described herein provide a database-driven interdepartmental workflow, communication, and data gathering tool that allows forms to be designed without relying on trained software developers. Instead, creation and maintenance of forms is placed in the hands of the users, and data can be gathered in a central location where software development staff can be repurposed to create analytics and data sharing/routing functionality company wide. Form security can be easily customized to permit different access levels for entire forms or individual sections within a form. Form creators/owners (e.g., users) are assisted through graphical user interfaces that generate section path logic options for each of the selected sections based on a multi-level hierarchy and the key input terms indicated by the user.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 6 and 7, the order of the blocks may be modified according to other embodiments. Further, non-dependent signals and/or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 220, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. No claim element of a claim is to be interpreted under 35 U.S.C. § 112(f) unless the claim element expressly includes the phrase "means for" or "step for."

What is claimed is:

1. A method, comprising:
   storing, by a network device and in a memory, control object definitions;
   providing, by the network device, a section user interface to solicit a compilation of control objects for a section template;
   providing, by the network device, a forms user interface to assemble multiple section templates into an interactive form, wherein providing the forms user interface comprises:
      soliciting user input for selected sections, from a group of stored section templates that includes the section template, to be used in the interactive form,
      providing an interface to assemble the selected sections into a multi-level hierarchy,
      soliciting, from a user, input options for the selected sections to trigger advancement through the interactive form,
      generating section path logic options for each of the selected sections based on the multi-level hierarchy and the input options, wherein the generating includes applying a machine learning model to rank and list first more probable path options, of the section path logic options,
      receiving, from the user, user selections from the section path logic options, and
      generating, based on the user selections, a section tree for the interactive form;
   providing, by the network device, access by other registered users to the interactive form;
   receiving, by the network device and from the other registered users, form data via the interactive form; and
   storing, by the network device, the form data associated with the interactive form.

2. The method of claim 1, wherein each of the other registered users is assigned to one or more access groups, and wherein providing the forms user interface further comprises:
   soliciting access group control settings for each of the selected sections.

3. The method of claim 2, wherein providing access by the other registered users to the interactive form further comprises:
   enforcing the access group control settings for each of the selected sections on a section-by-section basis.

4. The method of claim 1, wherein each of the other registered users is assigned to one or more access groups, and wherein providing the forms user interface further comprises:
   soliciting access group control settings for the interactive form.

5. The method of claim 4, wherein providing access by the other registered users to the interactive form further comprises:
   enforcing the access group control settings for the interactive form.

6. The method of claim 1, wherein providing the forms user interface further comprises:
   generating, based on the section tree, an interactive form preview.

7. The method of claim 1, further comprising:
   storing the interactive form in a database that includes multiple interactive forms.

8. The method of claim 1, wherein providing the section user interface further comprises:
   soliciting a user selection of selected control objects, from a group of control objects, to be used in the section template,
   soliciting a user selection of an order for the selected control objects within the section template,
   soliciting, via a structured input template, available control settings for each of the selected control objects, and
   generating an interactive rendering of the section template.

9. The method of claim 1, wherein the section user interface is configured to:
   assign a contact for auto-generated notices associated with changes to the section template, or
   assign a contact for auto-generated notices when the section template is empty.

10. The method of claim 1, wherein generating the section path logic options further comprises:
    presenting, to the user, path logic options for one of the selected sections,
    receiving a path logic input for the one of the selected sections, and
    generating, based on the path logic input and the multi-level hierarchy, path logic options for a subsequent one of the selected sections.

11. A network device, comprising:
    a communications interface configured to exchange data with network devices in a private network;
    one or more processors configured to:
       store, in a memory, control object definitions;
       provide a section user interface to solicit a compilation of control objects for a section template;
       provide a forms user interface to assemble multiple section templates into an interactive form, wherein the forms user interface is configured to:
          solicit user input for selected sections, from a group of stored section templates that includes the section template, to be used in the interactive form,
          provide an interface to assemble the selected sections into a multi-level hierarchy,
          solicit, from a user, input options for the selected sections to trigger advancement through the interactive form,
          generate section path logic options for each of the selected sections based on the multi-level hierarchy and the input options, wherein the generating includes applying a machine learning model to rank and list first more probable path options, of the section path logic options, receive, from the user, user selections from the section path logic options, and generate, based on the user selections, a section tree for the interactive form;

provide access by other registered users to the interactive form;

receive, from the other registered users, form data via the interactive form; and store the form data associated with the interactive form.

12. The network device of claim 11, wherein each of the other registered users is assigned to one or more access groups, and wherein, when providing the forms user interface, the one or more processors is further configured to:

solicit access group control settings for each of the selected sections.

13. The network device of claim 12, wherein providing access by the other registered users to the interactive form, the one or more processors is further configured to:

enforce the access group control settings for each of the selected sections on a section-by-section basis.

14. The network device of claim 11, wherein the forms user interface is further configured to:

generate, based on the section tree, an interactive form preview.

15. The network device of claim 11, wherein the one or more processors is further configured to:

store the interactive form in a database that includes multiple interactive forms.

16. The network device of claim 11, wherein, when providing the section user interface, the one or more processors are further configured to:

assign a unique identifier for the section template, solicit a user selection of selected control objects, from a group of control objects, to be used in the section template, solicit a user selection of an order for the selected control objects within the section template, solicit, via a structured input template, available control settings for each of the selected control objects, and generate an interactive rendering of the section template.

17. The network device of claim 11, wherein, when generating the section path logic options, the one or more processors are further configured to:

present, to the user, path logic options for one of the selected sections, receive path logic input for the one of the selected sections, and generate, based on the path logic input and the multi-level hierarchy, path logic options for a subsequent one of the selected sections.

18. A non-transitory computer-readable medium, storing instructions executable by one or more processors, the non-transitory computer-readable medium comprising one or more instructions to:

store, in a memory, control object definitions;

provide a section user interface to solicit a compilation of control objects for a section template;

provide a forms user interface to assemble multiple section templates into an interactive form, wherein the forms user interface is configured to:

solicit user input for selected sections, from a group of stored section templates that includes the section template, to be used in the interactive form, provide a drag-and-drop interface to assemble the selected sections into a multi-level hierarchy, solicit, from a user, input options for the selected sections to trigger advancement through the interactive form, generate section path logic options for each of the selected sections based on the multi-level hierarchy and the input options, wherein the generating includes applying a machine learning model to rank and list first more probable path options, of the section path logic options, receive, from the user, user selections from the section path logic options, and generate, based on the user selections, a section tree for the interactive form;

provide access by other registered users to the interactive form;

receive, from the other registered users, form data via the interactive form; and store the form data associated with the interactive form.

19. The non-transitory computer-readable medium of claim 18, wherein the instructions to generate section path logic options further comprise one or more instructions to:

present, to the user, path logic options for one of the selected sections, receive path logic input for the one of the selected sections, and generate, based on the path logic input, path logic options for a subsequent one of the selected sections.

20. The non-transitory computer-readable medium of claim 18, when the instructions to provide the section user interface, further comprise one or more instructions to:

solicit a user selection of selected control objects, from a group of control objects, to be used in the section template, solicit, via a structured input template, available control settings for each of the selected control objects, and generate an interactive rendering of the section template.

* * * * *